United States Patent [19]
Molstad

[11] 3,783,972
[45] Jan. 8, 1974

[54] WIRE LUBRICATING DEVICE
[76] Inventor: David R. Molstad, Box 318, Blair, Wis. 54616
[22] Filed: Dec. 16, 1971
[21] Appl. No.: 208,695

[52] U.S. Cl. .............................. 184/15 R, 118/307
[51] Int. Cl. ............................................... F16n 3/10
[58] Field of Search ................ 184/15 R, 16, 105 R, 184/28; 174/135; 254/134.3; 118/405, 411, 307

[56] References Cited
UNITED STATES PATENTS
| | | | |
|---|---|---|---|
| 2,435,120 | 1/1948 | Baker | 184/16 |
| 3,363,879 | 1/1968 | Irik | 254/134.3 FT |
| 3,459,156 | 8/1969 | Harter | 184/15 R X |
| 3,306,581 | 2/1967 | Miller | 254/134.3 FT |
| 1,915,443 | 6/1933 | Pelouch | 184/28 |

FOREIGN PATENTS OR APPLICATIONS
825,301  12/1959  Great Britain .................... 184/15 R Primary Examiner—Manuel A. Antonakas
Attorney—Irwin C. Alter et al.

[57] ABSTRACT

A wire lubricating device for lubricating cable to facilitate sliding the cable through conduit. The device is a hollow cylindrical tube section which fits around the wire and holds the lubricant under pressure therein. Apertures juxtaposed to the cable spread the lubricant on the cable as it passes through the device.

2 Claims, 4 Drawing Figures

PATENTED JAN 8 1974  3,783,972
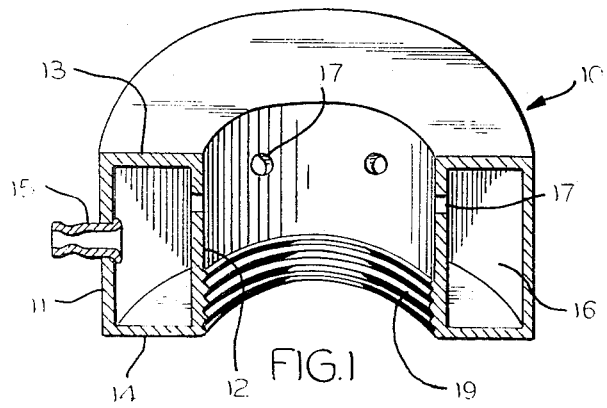
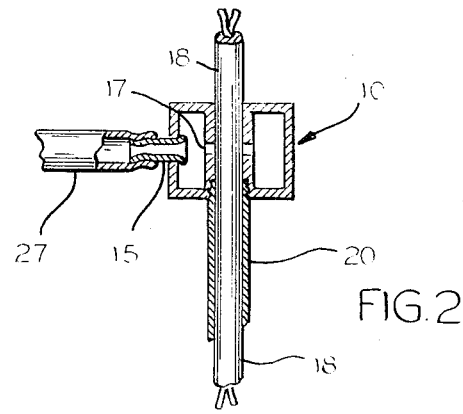
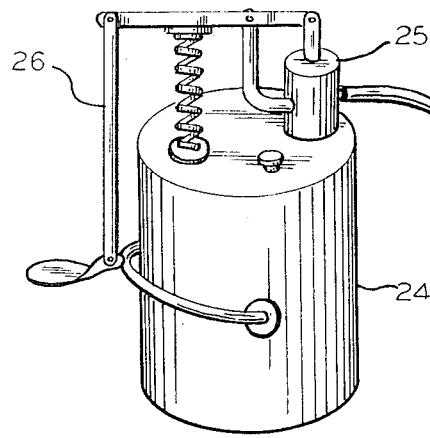
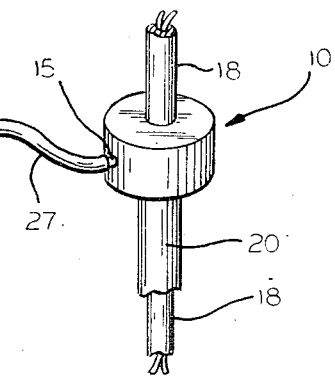
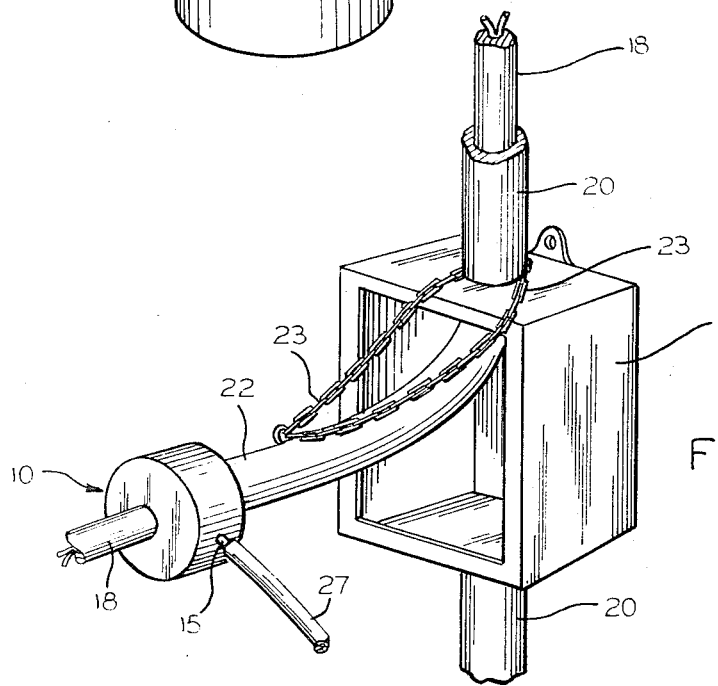
INVENTOR
DAVID R. MOLSTAD
BY
*Alter, Weiss and Whitesel*
ATTORNEYS

WIRE LUBRICATING DEVICE

My invention relates to wire lubricating devices, and more particularly to such devices for applying lubricant to the outer surface of a wire, or cable, while pulling the wire or cable through a conduit.

The prime object of my invention is to provide wire lubricating devices that eliminate manual labor, and automatically apply lubricants under pressure, mechanically to the outer surface of wire or cable.

Another object of my invention is to provide wire lubricating devices of the character described, that may be designed to accommodate any type or size of cable.

Still another object is to provide lubricating devices that store lubricants that may be pressurized either mechanically or by a manually actuated pump.

A further object of my invention is to provide lubricating devices that may be designed to be adaptable for use with conduit boxes of conventional design.

It is apparent to anyone, that quite frequently it is inconvenient, and costly, to apply the lubricant to wire, or cable manually, due to the cost of labor and the amount of time consumed in the operation. The device illustrated, described, and claimed herein, provides a positive means of applying the lubricant onto the outer peripheral surface of the cable, as it is pulled through the unit.

It may be employed for underground cable, or electrical construction of any conventional type.

It is simple in construction, economical to manufacture, positive in its performance, and may be operated without special mechanical skill.

Other and further objects of my invention will become more apparent as the description proceeds, when taken in conjunction with the drawings, in which:

FIG. 1, is a vertical perspective, cross-sectional view of a cylindrical lubricating head, constituting my invention;

FIG. 2, is a vertical cross-sectional view of the lubricating head, applied to a portion of conduit, with a fragmentary portion of conventional cable passing therethrough;

FIG. 3, is a perspective view of a suggested conventional tank of lubricant, equipped with a manually operated pump feeding the lubricant to the head, while applying the lubricant to the cable being pulled therethrough; and FIG. 4, is a perspective view of the device, when applied to a conventional conduit box.

Similar characters of reference indicate corresponding parts and features throughout the several views, and referring now to the same, the character 10 shows in general, a cylindrical closed body structure, consisting of an outer wall 11, an inner wall 12, a top plate 13, and a bottom plate 14. The outer wall 11 is equipped with a conventional hydraulic fitting 15, to lead the lubricating material into the cylindrical enclosure 16. The inner wall 12 is equipped with a plurality of apertures 17, to permit the extrusion of the lubricant to be extruded under pressure, whereby the lubricant is spread on the outer peripheral area of the cable 18 as the cable passes through the inner wall 12 (See FIG. 2).

The inner wall 12, is shown threaded at 19, for the engagement of the threaded conduit 20.

In FIG. 4, I show a conventional conduit box 21, supported by the conduit 20, with a radially disposed member 22 supporting the body 10, which member may be supported by means of a chain, or the like, shown as 23 in any convenient manner.

By referring to FIG. 3, it will be noted that I show a tank 24 containing the lubricant, which tank 24 is equipped with a pump 25, which obviously may be of any conventional design, and constructed to be operated by a conventional lever assembly, which is generally shown as 26. The pump 25 has a tube 27 leading therefrom to the fitting 15 on the body 10 for conveying the lubricant from the tank 24 to the body 10. In this manner, the lubricant will be applied to the cable 18 as it is being pulled through the body 10. If desired, an electrically operated pump (not shown) may be employed, which pump may be controlled by a switch or lever in any conventional manner.

From the above description, it can be seen that the device is positive in its operation, and although I have shown a specific construction and arrangement of the parts and features constituting my invention, I am fully cognizant of the fact that many changes may be made in the parts and features without effecting their operativeness, and I reserve the rights to make such changes as I may deem necessary, without department from the spirit of my invention or the scope of the appended claims.

Having thus described my invention, what I claim and desire to secure by letters patent in the United States, is:

1. A lubricating device comprising:
   a tank having a passageway enabling a cable to pass therethrough,
   said tank comprising a hollow cylindrical tubular section having inner walls and outer walls,
   said inner walls being contiguous to said cable passing therethrough,
   said inner walls being threadably attached to a conduit so that the cables can pass from the device into the conduit,
   lubricant supply means for supplying said lubricant to said tank,
   a plurality of spaced apart apertures communicating between said tank and said passageway, and
   said lubricant supply means including means to apply pressure to said tank whereby said lubricant is extruded through said apertures and applied evenly to said cable passing through said passageway.

2. The device of claim 1, and wherein said means for supplying lubricants under pressure comprises a fitting on said outer wall,
   pump means attached to said fitting for supplying the lubricant under pressure to said tank.

* * * * *